(12) United States Patent
Etemad et al.

(10) Patent No.: US 8,739,550 B2
(45) Date of Patent: Jun. 3, 2014

(54) TWO STAGE COMBUSTOR WITH REFORMER

(75) Inventors: Shahrokh Etemad, Trumbull, CT (US); Benjamin D. Baird, Rocky Hill, CT (US); Subir Roychoudhury, Madison, CT (US); William C. Pfefferle, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 916 days.

(21) Appl. No.: 12/924,671

(22) Filed: Sep. 30, 2010

(65) Prior Publication Data

US 2011/0079016 A1 Apr. 7, 2011

Related U.S. Application Data

(60) Provisional application No. 61/277,943, filed on Sep. 30, 2009.

(51) Int. Cl.
*F02C 7/22* (2006.01)

(52) U.S. Cl.
USPC ............... 60/780; 60/733; 60/747; 60/736; 60/777

(58) Field of Classification Search
USPC .............. 60/730, 736, 723, 777, 39.822, 780, 60/733, 747
See application file for complete search history.

(56) References Cited

U.S. PATENT DOCUMENTS

| | | | |
|---|---|---|---|
| 4,202,167 A * | 5/1980 | Suggitt et al. ............... | 60/780 |
| 5,051,241 A | 9/1991 | Pfefferle | |
| 6,156,444 A | 12/2000 | Smith | |
| 6,174,159 B1 * | 1/2001 | Smith et al. ................. | 431/7 |
| 6,394,791 B2 * | 5/2002 | Smith et al. ................. | 431/170 |
| 6,748,745 B2 * | 6/2004 | Ul Karim et al. ............ | 60/777 |

(Continued)

FOREIGN PATENT DOCUMENTS

WO   W02004060546 A2   7/2004

OTHER PUBLICATIONS

S. Roychoudhury, D. Walsh, D.Chu, E.Kallio, "Performance of a Diesel JP-8 Reformer," 2006 Fuel Cell Seminar, Honolulu, Hawaii, Nov. 13-17, 2006.

(Continued)

*Primary Examiner* — William H Rodriguez
*Assistant Examiner* — Steven Sutherland
(74) *Attorney, Agent, or Firm* — Robert L. Rispoli

(57) ABSTRACT

The present invention provides a combustor for an aerospace gas turbine engine comprising two stages wherein each stage defines an inlet and an exit. The second stage inlet is in fluid communication with the first stage exit such that a first flowpath is defined and it passes substantially through the second stage. A plurality of flow channel tubes is positioned within the second stage and each flow channel tube passes sealingly through a header plate positioned upstream of the second stage inlet thereby defining a second flowpath that also passes substantially through the second stage. The first flowpath exit and the second flowpath exit are positioned adjacent and proximate to one another to provide for the generation of microflames or microflame jets exiting the second stage from between and around the flow channel tube exits. The first stage of the combustor provides a gasifier and a reformer. The present invention also may comprise an igniter for further combustion of the reacted products or an external heat source for start-up. The second stage also may comprise a microflame combustor.

13 Claims, 5 Drawing Sheets

(56) References Cited

U.S. PATENT DOCUMENTS

| | | | |
|---|---|---|---|
| 6,752,623 B2 * | 6/2004 | Smith et al. | 431/170 |
| 7,395,670 B1 * | 7/2008 | Drnevich et al. | 60/780 |
| 7,802,434 B2 * | 9/2010 | Varatharajan et al. | 60/780 |
| 2005/0028445 A1 * | 2/2005 | Roychoudhury et al. | 48/210 |
| 2006/0080967 A1 * | 4/2006 | Colket, III | 60/777 |
| 2007/0151154 A1 | 7/2007 | Lyubovsky | |
| 2008/0044347 A1 | 2/2008 | Roychoudhury | |
| 2008/0092513 A1 * | 4/2008 | Carroni et al. | 60/39.23 |
| 2008/0110172 A9 * | 5/2008 | Bruck | 60/723 |
| 2009/0293358 A1 | 12/2009 | Roychoudhury | |

OTHER PUBLICATIONS

M. Castaldi, M. Lyubovsky, R. LaPierre, W.C. Pfefferle, S. Roychoudhury, "Performance of Microlith Based Catalytic Reactors for an Isooctane Reforming System," SAE International, Publ. No. 2003-01-1366, Mar. 3, 2003.

"Microlith (Catalytic Reactor)," Wikipedia (http://en.wikipedia.org/wiki/Microlith_(catalytic_reactor), Dec. 16, 2013.

* cited by examiner

TWO STAGE COMBUSTOR WITH REFORMER

CROSS-REFERENCE

This application claims the benefit of U.S. Provisional Application No. 61/277,943 filed Sep. 30, 2009.

GOVERNMENT RIGHTS

This invention was made with support from the U.S. government under U.S. Contract No. FA8650-09-M-2983. The U.S. Government holds certain rights in this invention.

FIELD OF THE INVENTION

This invention pertains to compact combustors for aerospace gas turbine engines. More specifically, this invention pertains to compact combustors that exhibit good flame stability and high combustion efficiency.

BACKGROUND OF THE INVENTION

Aerospace gas turbine engines require compact combustors that exhibit good flame stability and high combustion efficiency. For a typical aerospace engine, the combustor compactness is substantially dictated by the volume required for liquid atomization, mixing with combustion air, and combustion of the resulting mixture. This resulting mixture often consists of droplets in a heterogeneous fuel/air mixture. Consequently, heterogeneous burning of the resulting mixture usually requires extended combustion times due to need of residence time to fully vaporize the droplets prior to combustion. However, such extended combustion times often lead to larger combustion zones, lack of flame stability and high pollutant emissions, particularly of unburned hydrocarbons.

Existing engine concepts reduce time-to-combust by enhancing mixing/evaporation rates through devices such as turbulence generators or flow swirlers. These devices lead to an increased combustor pressure drop and may lead to flame instability, particularly in part-load situations. For a high performance aerospace combustor, typical times from injection to final fuel burn-out ("residence time") of the combustion process can be roughly specified as follows: 1 to 3 ms for the fuel spray to distribute through the air followed by 2 to 3 ms for droplet vaporization with combustion taking an additional 1 to 2 ms. This leads to a total required residence time of 4 to 8 ms which may be too long for certain combustor designs, in particular, interturbine combustors.

Alternately, as seen in Trapped Vortex Combustors (TVC), a region of the combustor can be designed such as to locally produce a residence time sufficiently long to achieve combustion, and the heat/intermediate products from this region anchor the flame in the fast moving regions of the combustor.

None of the prior art, however, provides a compact combustor that exhibits good flame stability and high combustion efficiency in an aerospace gas turbine engines require. Therefore, it is an object of the present invention to provide a viable improved combustor for aircraft engines that exhibit good flame stability and high combustion efficiency.

SUMMARY OF THE INVENTION

It has now been found that the need for compact, low residence time, efficient, and non-polluting combustors for aerospace gas turbine engines be achieved by decoupling the vaporization and downstream combustion in a two-step combustion system.

The present invention provides a combustor for an aerospace gas turbine engine comprising two stages: (i) a first stage that defines a first stage inlet and a first stage exit; and (ii) a second stage that defines a second stage inlet and a second stage exit. The second stage inlet is in fluid communication with the first stage exit such that a first flowpath is defined and it passes substantially through the second stage. The first flowpath defines an inlet and an exit wherein the inlet is defined by the point of fluid communication among the first stage exit and the second stage inlet.

A plurality of flow channel tubes is positioned within the second stage. Each flow channel tube defines a flow channel tube inlet and a flow channel tube exit. Each flow channel tube inlet passes sealingly through a header plate positioned upstream of the second stage inlet thereby defining the inlet to a second flowpath. The second flowpath passes substantially through the second stage and defines a second flowpath exit defined by the plurality of flow channel tube exits. The first flowpath exit and the second flowpath exit defined by the plurality of flow channel tube exits are positioned adjacent and proximate to one another to provide for the generation of microflames or microflame jets exiting the second stage from between and around the flow channel tube exits.

Stage I of a preferred embodiment of the present invention comprises a gasifier and a reformer. As stated above, preferably the reformer comprises an ultra-short-channel-length substrate. The present invention also may comprise an igniter for further combustion of the reacted products or an external heat source for start-up. The second stage also may comprise a microflame combustor.

The scope of the present invention also includes a method for combusting jet fuel by reacting a fuel-rich mixture of fuel and air to form a reacted mixture comprising CO and hydrogen. The reacted mixture is passed into heat exchange with combustion air to form a heat exchanged mixture. Subsequently, microjets of the heat exchanged mixture are passed into contact with the combustion air for further combustion.

In further detail, Stage I comprises gasifying and reforming higher hydrocarbon liquid fuels (e.g. aviation fuels) to gaseous fuel containing highly reactive species, such as $H_2$ and CO, by using an ultra-short-channel-length reactor. Such an ultra-short-channel-length substrate reactor is commercially available as Microlith® reactor from Precision Combustion, Inc., located in North Haven, Conn. The reactor is readily fast-started with electrical heating to produce a liquid-fueled reforming system producing hot partial oxidation products. The gaseous fuel produced is fed to a heat exchange reactor for partial heat exchange with the balance of the combustion air prior to combustion downstream allows efficient, low NOx combustion in a short length combustion zone suitable for aircraft. Preferably, the heat exchange reactor comprises a fuel-rich reactor such as that disclosed in U.S. Pat. No. 6,394,791 and referred to herein as an "RCL type heat exchanger".

On engine cranking for start-up, an electrical heater provides for air heating, fuel vaporization, and catalyst heating as in JP-8 fuel reformer systems. The product gases are fed to an RCL type heat exchanger with the air required for downstream combustion. Low NOx combustion is achieved with a downstream microjet array of contact flames with the heat exchanged air. To provide turndown, a plurality of such burners is assembled around a central axis such that one or more can be operated to provide the needed power.

The potential benefits of the two-stage combustion process of the present invention include:

1. A catalytic surface operating in fuel-rich conditions is used to vaporize the fuel in a small volume. Feedback from the hot catalytic surfaces enhances fuel vaporization. This leads to a compact mixing chamber.
2. The resultant mixture is incapable of auto-ignition due to lack of oxygen (all oxygen is consumed in the reforming process), allowing for the reformer to be located independent of the second stage combustor (if desired).
3. The downstream combustor (Stage II) is smaller due to increased reactivity of the resultant gaseous mixture allowing much faster burnout times. This is achieved through:
    i. Reforming the liquid fuel into a gaseous fuel converts the fuel into more reactive species for easier downstream combustion.
    ii. An array of microflames allows complete combustion within a smaller residence time of the highly reactive fuel mixture containing $H_2$ and CO.
4. Fuel vaporization is separated from the final combustion zone which:
    i. Allows much of the long residence time requirements of current combustors for liquid vaporization and/or droplet combustion to be achieved outside the combustor.
    ii. Leads to reduced pressure driven instability.

Analytical results successfully demonstrated the proof-of-concept for the Reforming Vaporizer/Microflame model. The proof-of-concept demonstrated a novel reformer-injector system for aviation fuel combustion that offers the ability to produce compact/low residence time flames at high combustion efficiency. A potential engine design was selected to provide operating conditions and the analytical results based on these conditions showed that:

1. A small amount of reforming can produce significant increase in laminar flame speed (and thus flame stability).
2. Fuel reforming reduced the ignition delay time by an order of magnitude.
3. Short compact flame exists on end of the injector for the Rapid Mixing Microflame (RMM) Combustor.
4. Complete combustion and mixing occurs within 1.2 inches, less than 1 ms, from the end of the injector allowing significantly smaller downstream combustor.

Studies were conducted to optimize the fuel converted to reactive species, and to evaluate laminar flame speeds for the different outlet fuel compositions and the auto-ignition delay times for the species entering the RMM injector from the reformer section. Analytical studies were conducted to evaluate mixing and flame studies for the RMM combustor and system application into a missile combustor to improve combustion efficiency and stability. A comprehensive study also was performed to prove capability of the reforming vaporizer (Stage I). This involved investigating auto-ignition times in the spray region and sizing to produce optimum reforming for a downstream stable flame with reduced residence times.

DETAILED DESCRIPTION OF THE INVENTION

Figure 1:
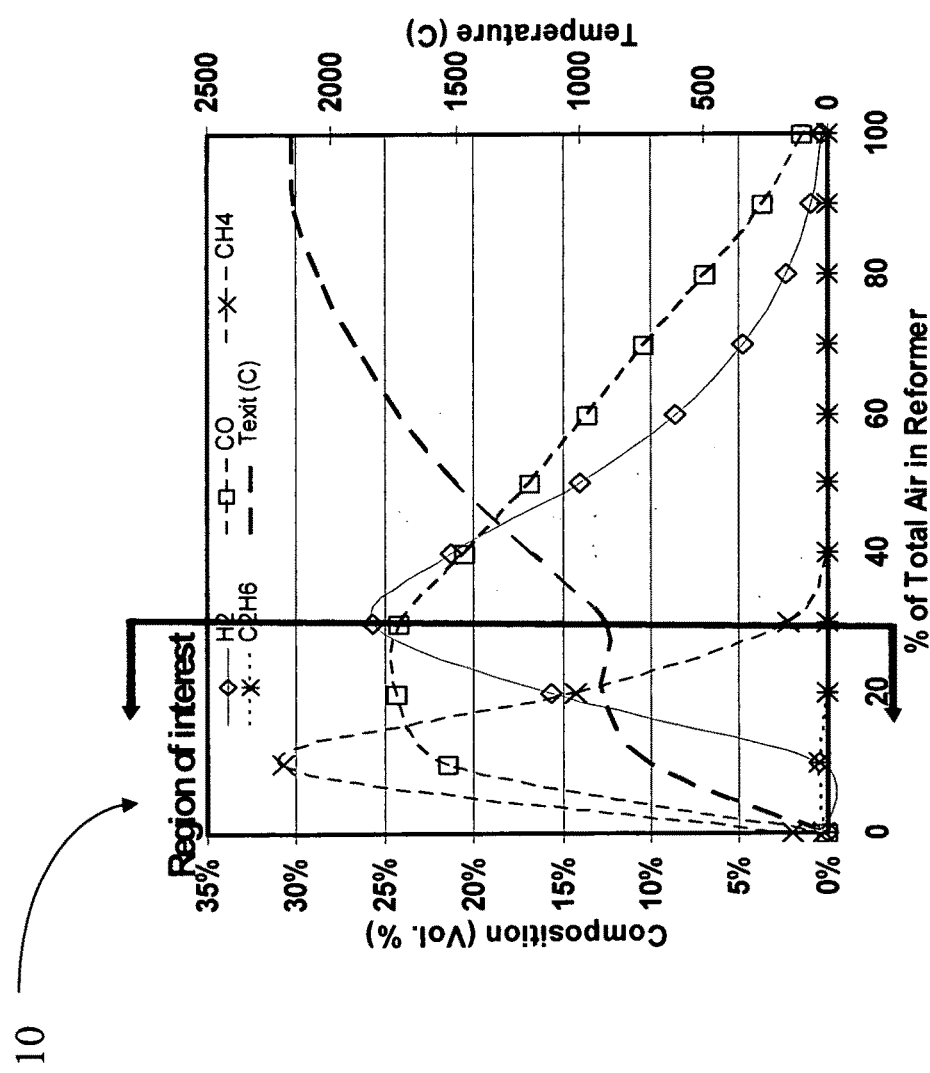
FIG. 1 provides a graphical representation of exit composition and temperature of reformate exiting a combustor in accordance with the present invention.

FIG. 1 shows the fuel compositions and temperature of the reformate exiting a reformer wherein the air inlet temperature was 260 degrees C. and the heptane fuel downstream Equivalence Ratio equals 1. As shown in the Region of Interest (10), only a small amount of reforming is required to breakdown the heptane to simpler hydrocarbons demonstrating the reformer efficiency. The percentage of hydrogen with minimal hydrocarbons in the reformate peaks at 30% of the total air being used to reform the fuel. At this condition, we achieve 26% $H_2$, 24% CO, 2% $CH_4$, and minimal other higher hydrocarbons at a material temperature of 900° C./650° F. This is the optimal design since it improves flame stability due to higher hydrogen content and keeps the material within design limits. The reformer can stably operate at reduced air flow rates, however this results in reduced hydrogen content, lower exit temperatures and increased higher hydrocarbons (reduced fuel conversion to C1).

Greater than 30% air flow to the reformer region results in reduced levels of hydrogen (as more hydrogen reacts to water and is diluted by greater quantities of nitrogen) and higher exit temperatures due to the exothermic reaction. Thus the reactor should be operated at a reactor air percentage less than about 30%. This analytical model has been fully developed and can be easily applied to other conditions that may be of interest to account for system variability.

Figure 2:
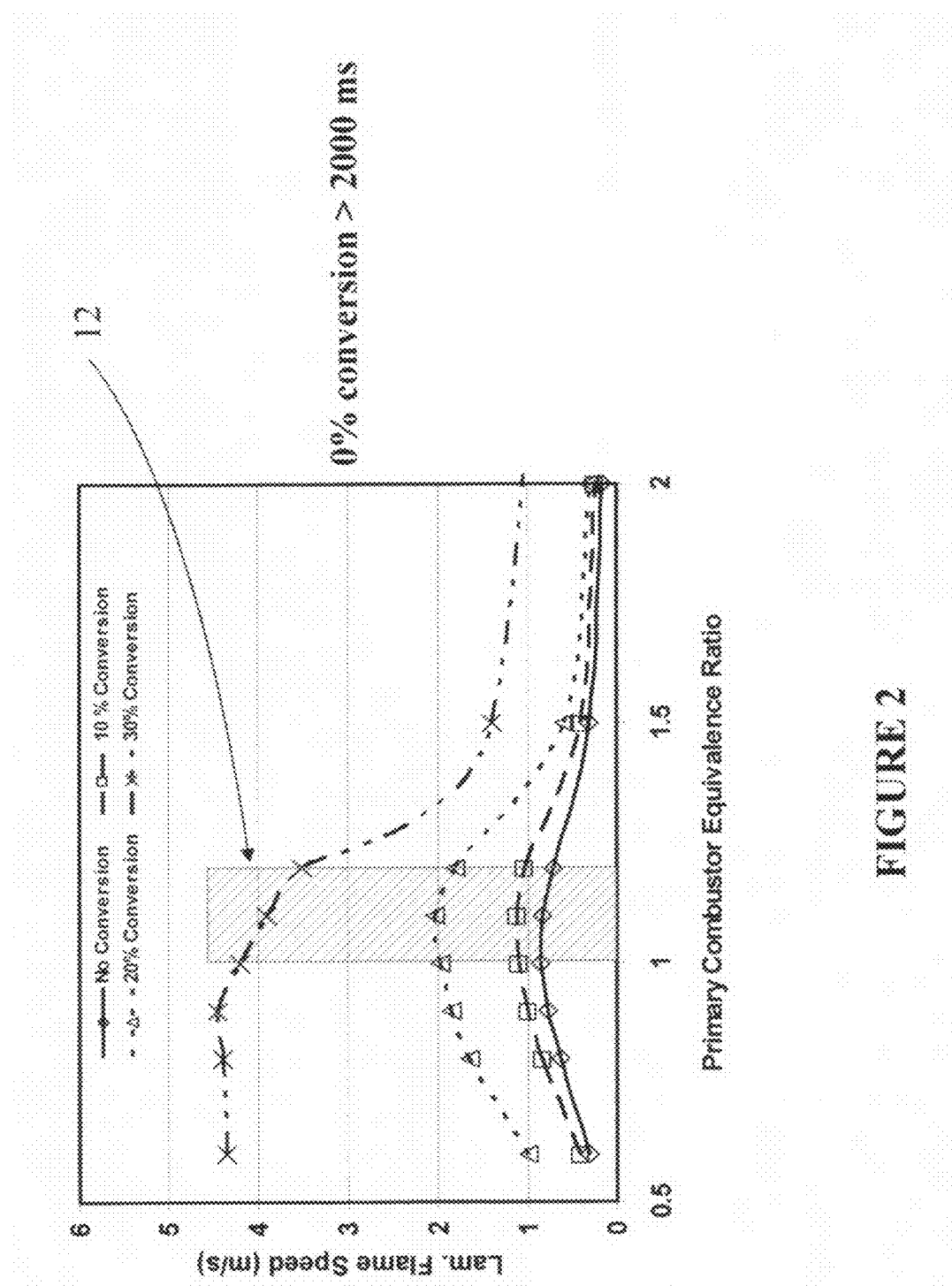
FIG. 2 provides a graphical representation of the simulated laminar flame speed for different fuel conversions within a combustor in accordance with the present invention.

Flame speed calculations were conducted to evaluate the effect of the Reforming Vaporizer product on the flame characteristics. FIG. 2 shows the simulated laminar flame speed for different fuel conversions (e.g. percentage of total air provided to the reformer) wherein the air inlet temperature was 260 degrees C. using heptane fuel. As shown in FIG. 2, a small amount of reforming can produce a significant increase in laminar flame speed (and thus flame stability) and increasing levels of reforming produced higher flame speeds. The shaded area (12) in FIG. 2 corresponds to the region of interest of the missile engine combustor primary zone which tended to run slightly fuel rich. An increase of flame speed from 0.7 m/s with no reforming (0% conversion) to 4.2 m/s at 30% conversion is achieved, a change of 500%. This significant increase in the flame speed shows the increase in the reactive species present and increase in inlet temperature, both which enhance flame stability.

Figure 3:
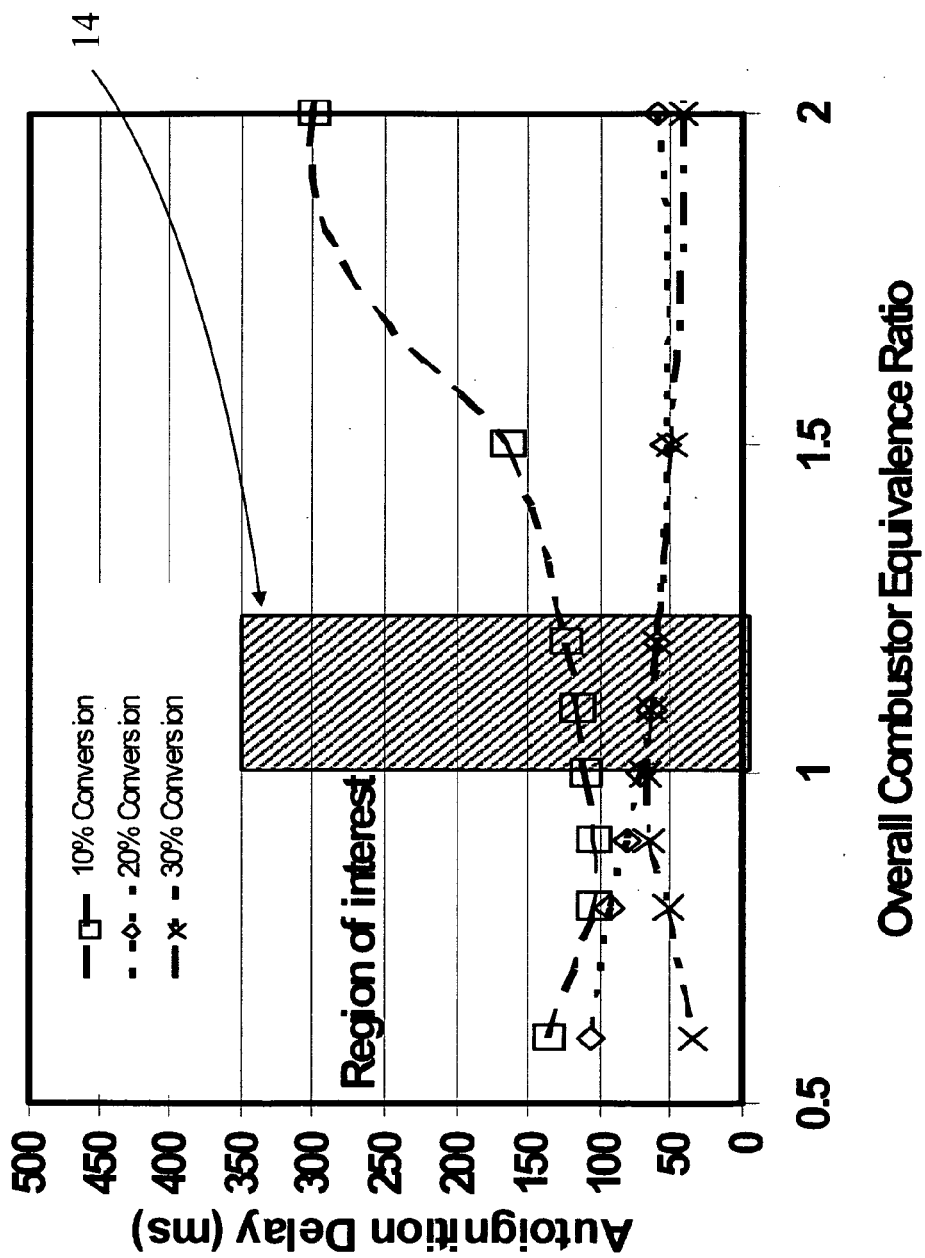
FIG. 3 provides a graphical representation of the ignition delay time for different fuel conversions within a combustor in accordance with the present invention.

FIG. 3 shows the ignition delay time for the different fuel conversions which can be termed as a measure of the fuel reactivity, again wherein the air inlet temperature was 260 degrees C. using heptane fuel. As a baseline comparison, ignition delay for the unreformed fuel was computed. The ignition delay time for the unreformed fuel was greater than 2000 ms (not plotted on figure due to scale). After reforming, as shown in the region of interest (14) in FIG. 3, the ignition delay dropped to 50 to 100 ms. This is an order of magnitude reduction which is a key benefit of reforming. A small amount of reforming of 10% dropped the ignition delay to 100 ms.

The data presented in FIG. 3 shows that reforming the fuel, even to a small extent, has a significant reduction in the ignition delay and makes the flame highly reactive, hence improving flame stability and improving combustion efficiency. Both the increase in flame speed and lowering of auto-ignition delay will allow the reduction in combustor length by allowing the highly reactive flame to become shorter, more compact, and more firmly anchored on the Stage II exit.

Figure 4:
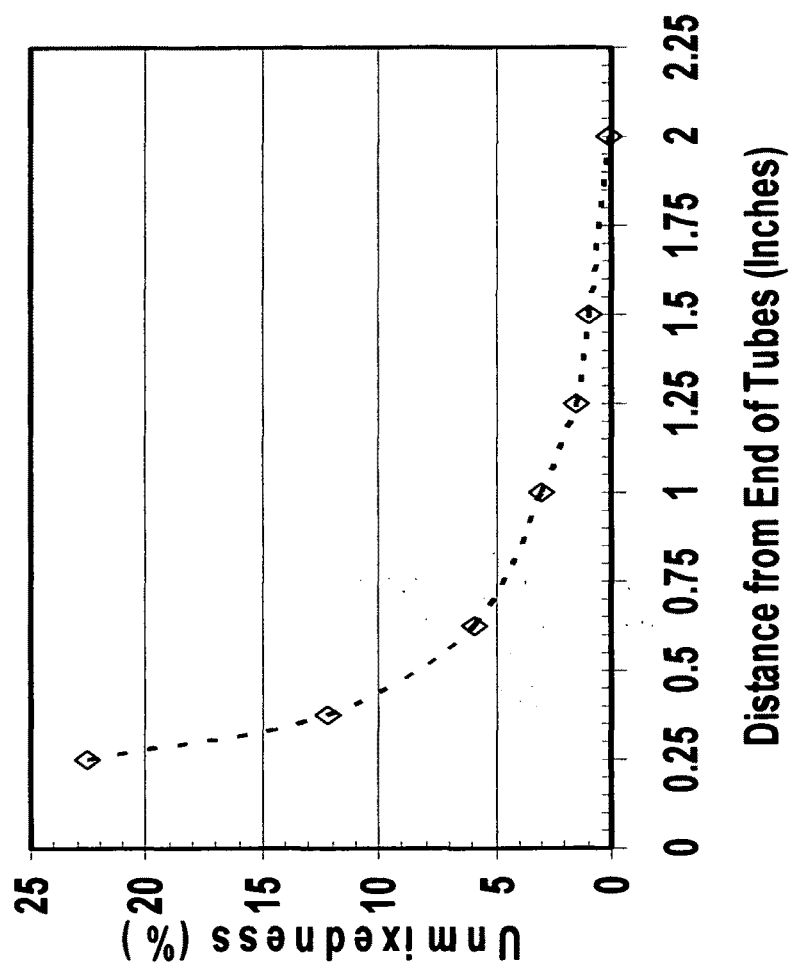
FIG. 4 provides a graphical representation of the percentage of unmixedness from the RMM combustor exit of a combustor in accordance with the present invention.

The injector was subsequently analyzed to assess the behavior of the injector downstream of the reformer. The analysis was performed to address suitability of the injector for mixing/combustion of the partially reformed fuel products. A downstream equivalence ratio of 1.0 was considered for these studies. FIG. 4 provides a graphical representation of the percentage of unmixedness from the RMM combustor exit as a function of the distance from the end of the tubes within the combustor.

Non-reactive mixing studies were conducted to investigate the mixing characteristics of the injector. The analysis confirmed that the reactants (species from the reformer) became well mixed (less than 5% unmixedness) within one inch and approach perfectly mixed conditions within two inches from the exit of the mixing plane as can be seen from FIG. 4. Unmixedness was calculated by the standard deviation divided by the mean value of the profile through the given axial location.

Reacting flow simulations showed a flame strongly attached to the end of the injector exit plane. Complete combustion and mixing, as indicated by uniformity of the temperature profile, occurs within 1.2 inches from the end of the mixer. This corresponds to a residence time of <1 ms at the conditions of the simulation. This demonstrates that the injector can rapidly combust the reformate and provide a uniform temperature zone (pattern factor) at the turbine entrance. This demonstrates that the flame will show stability and robustness in actual operation. This also shows that the combustor could be made smaller through a reduced residence time by using an upstream reformer located outside of the combustor volume.

Figure 5:
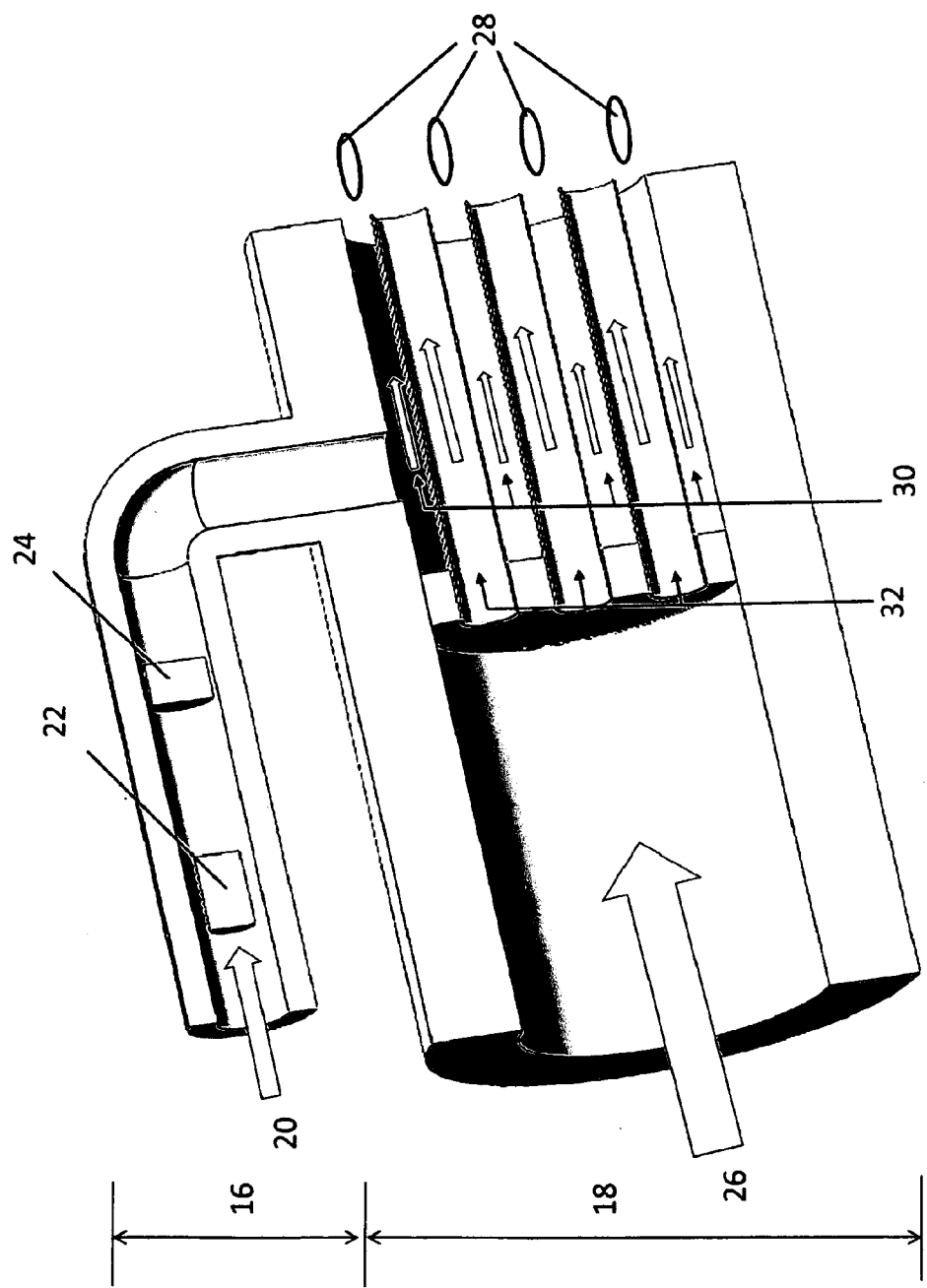
FIG. 5 provides an isometric view of a compact stable low-residence-time inter-turbine combustor in accordance with the present invention.

FIG. 5 provides a three-dimensional view of a compact stable low-residence-time inter-turbine combustor in accordance with the present invention. Stage I (16) of the combustor comprises a gasifier and reformer reactor (24). Stage II (18) of the combustor comprises a microflame combustor. In Stage I (16), reformer air (20) is passed into the combustor and a liquid fuel injector (22) provides fuel upstream of the Stage I (16) reactor (24). The Stage I reactor (24) converts liquid fuel into a reaction mixture comprising carbon monoxide and hydrogen and passes said reaction mixture into a first flowpath (30) in Stage II of the combustor. Preferably, reactor (24) comprises a Microlith® reactor. In Stage II (18), combustion air (26) is passed into the combustor via a plurality of second flowpath channels (32) for further combustion of the Stage I (16) reactor (24) products resulting in a combustor exit product microflame (28) configuration.

The two-stage combustor of FIG. 5 enables the relocation of Stage I away from the centerline of the combustor. This provides for shorter, more compact combustors and permits increased design flexibility. Vaporization residence times are decreased because: (i) the catalytic zone speeds vaporization incorporating heat feedback; and (ii) the catalyst enhances fuel reactivity during the process. Combustion residence time also is decreased by enabling the use of a more reactive fuel and by producing rapid mixing microflames.

Studies using dry reforming of liquid fuels indicates that Microlith® sizing should be [1.22*P/(mfuel)] in3 where P is pressure in atm. and mfuel is the fuel flow in lb/hr. These reforming volumes are based on a tested minimum reactor volume that produced 100% reforming. Other optimizations such as the effect of reduced catalyst volume and different reactor configurations can lead to further reduction in volume and are considered within the scope of this invention.

Additional studies were performed as outlined herein below with respect to a design concept for a two-stage burner for an FTA30 engine.

EXAMPLE 1

Conditions

Based on FTA30, a small turbofan engine for missile applications
Operating on JP-10
Full Load Inlet Conditions:
89.4 psia,
274° C./525° F.
Fuel flow: 28.7 lbm/hr
Airflow: 0.408 lbm/sec
Combustor volume of 10.3 in2
System Pressure drop of 6.49%
Expected operational lifetime of 1 hour, but capability to qualify at 5 hrs The results of Example 1 enabled the following design parameters:
Create Microlith® catalyst bed within existing combustor volume
Five tangential RMM devices provide downstream stabilization and bulk flow rotation for turbine inlet
Shown concept gives volume of Catalyst of 4.1 in3 for partial conversion (6.8 in3 for 100% conversion)
Expectations are that reduced catalyst volume can be used. Other concepts with reduced volume can be designed and are considered within the scope of the present invention.

EXAMPLE 2

Conditions

Generic Interturbine Combustor for engine power enhancement
Operating on typical jet fuels
At 100% load SLS Inlet conditions:
62 psia
732° C./1350° F.
Fuel Flow: 620 lb/hr,
Airflow: 22 lb/sec
Combustor volume depending on gas turbine
Pressure drop of 5%
Operational lifetime of 1000's of hours The results of Example 2 enabled the following design parameters:
Estimated required catalyst volume of 179 in3
Could be supplied by catalyst module of 6 in diameter and 7 in length While the present invention has been described in considerable detail, other configurations exhibiting the characteristics taught herein for compact combustors that exhibit good flame stability and high combustion efficiency are contemplated. For example, other reactor designs including but not limited to reactors comprising alternate reactor substrates, combustors comprising alternate fuel injector configurations, or combustors employing alternate two-stage configurations are considered within the scope of this invention. Therefore, the spirit and scope of the invention should not be limited to the description of the preferred embodiments described herein.

The invention claimed is:

1. A combustor for an aerospace gas turbine engine comprising:
   a) a first stage wherein the first stage defines a reformer comprising a first stage inlet and a first stage exit, the first stage inlet adapted to input all of a fuel to the reformer; the reformer further comprising a metal screen substrate and adapted to dry reform a fuel-rich mixture of fuel and air into a reacted fuel stream comprising carbon monoxide and hydrogen;
   b) a second stage wherein the second stage defines a second stage inlet and a second stage exit, and wherein the second stage inlet is in fluid communication with the first stage exit thereby defining a first flowpath having a first flowpath inlet, and wherein the first flowpath passes substantially through the second stage and defines a first flowpath exit;
   c) a plurality of flow channel tubes positioned within the second stage wherein each flow channel tube defines a flow channel tube inlet and a flow channel tube exit, and wherein each flow channel tube inlet passes sealingly through a header plate positioned upstream of the second stage inlet thereby defining a second flowpath having a second flowpath inlet defined by the plurality of flow channel tube inlets, and wherein the second flowpath passes substantially through the second stage and defines a second flowpath exit defined by the plurality of flow channel tube exits, further wherein the first flowpath adapted to pass the reacted fuel stream comprising carbon monoxide and hydrogen within the second stage is configured to be in heat exchange with the second flowpath adapted to pass combustion air; and
   (d) wherein the first flowpath exit and the second flowpath exit, defined at the termination of the plurality of flow channel tubes, are positioned adjacent and proximate to one another.

2. The combustor for the aerospace gas turbine of claim 1 wherein the first stage comprises a gasifier.

3. The combustor for the aerospace gas turbine of claim 1 wherein the reformer further comprises an ultra-short-channel-length substrate.

4. The combustor for the aerospace gas turbine of claim 3 wherein the ultra-short-channel-length substrate reformer provides conversion of jet fuel to a reacted fuel stream comprising carbon monoxide and hydrogen.

5. The combustor for the aerospace gas turbine of claim 1 further comprising an igniter.

6. The combustor for the aerospace gas turbine of claim 1 further comprising an external heat source for start-up.

7. The combustor for the aerospace gas turbine of claim 1 wherein the second stage further comprises a microflame combustor.

8. The combustor of claim 1 further configured to provide for 30 percent of the total air flow to be passed into the reformer.

9. The combustor of claim 1 further configured to provide for less than 5 percent unmixedness between the heat exchanged reaction mixture and the combustion air at a distance within 1 to 2 inches from the exits of the first and second flowpaths.

10. The combustor of claim 1 wherein the first stage reformer is positioned off center with respect to a centerline of the second stage of the combustor.

11. A method for combusting jet fuel comprising:
    a) reacting a fuel-rich mixture of jet fuel and air in a first stage of a combustor, the first stage comprising a reformer adapted to dry reform a mixture comprising air and jet fuel to form a reacted mixture comprising carbon monoxide and hydrogen, further wherein the reformer comprises a metal screen substrate and the reformer is adapted to input all of the jet fuel;
    b) passing the reacted mixture comprising carbon monoxide and hydrogen into a first flowpath within a second stage of the combustor, the second stage being adapted to provide heat exchange with combustion air to form a heat exchanged mixture comprising carbon monoxide and hydrogen; the combustion air being provided within a second flowpath within the second stage of the combustor, the second flowpath comprising a plurality of flow channel tubes through which the combustion air passes in heat exchange with the first flowpath; and
    c) passing the heat exchanged mixture of carbon monoxide and hydrogen, exiting the first flowpath as microjets around and between the plurality of flow channel tubes, into contact with the combustion air exiting the second flowpath for combustion.

12. The method of claim 11 wherein 30 percent of total air flow is passed into the reformer.

13. The method of claim 11 wherein fuel conversion in the reformer ranges from 20 to 30 percent.

* * * * *